US008017716B2

(12) United States Patent
Carrillo et al.

(10) Patent No.: US 8,017,716 B2
(45) Date of Patent: Sep. 13, 2011

(54) MORPHOLINE-SUBSTITUTED POLY(ARYLENE ETHER) AND METHOD FOR THE PREPARATION THEREOF

(75) Inventors: Alvaro Carrillo, Delmar, NY (US); Stephen M. Farnell, Mechanicville, NY (US); Hua Guo, Selkirk, NY (US)

(73) Assignee: Sabic Innovative Plastics IP B.V. (NL)

( * ) Notice: Subject to any disclaimer, the term of this patent is extended or adjusted under 35 U.S.C. 154(b) by 10 days.

(21) Appl. No.: 12/495,980

(22) Filed: Jul. 1, 2009

(65) Prior Publication Data
US 2011/0003962 A1 Jan. 6, 2011

(51) Int. Cl.
*C08G 65/38* (2006.01)
*C08G 63/02* (2006.01)

(52) U.S. Cl. ........ 528/216; 524/141; 524/151; 524/153; 524/404; 524/445; 525/68; 525/391; 525/397

(58) Field of Classification Search .................. 524/141, 524/151, 153, 404, 445; 525/68, 391, 397
See application file for complete search history.

(56) References Cited

U.S. PATENT DOCUMENTS

| | | |
|---|---|---|
| 2,071,250 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,465,319 A | 3/1949 | Whinfield et al. |
| 2,512,606 A | 6/1950 | Bolton et al. |
| 2,720,502 A | 10/1955 | Caldwell |
| 2,727,881 A | 12/1955 | Caldwell et al. |
| 2,822,348 A | 2/1958 | Haslam |
| 3,047,539 A | 7/1962 | Pengilly |
| 3,354,129 A | 11/1967 | Edmonds et al. |
| 3,671,487 A | 6/1972 | Abolins |
| 3,919,177 A | 11/1975 | Campbell |
| 3,953,394 A | 4/1976 | Fox et al. |
| 4,128,526 A | 12/1978 | Borman |
| 4,440,923 A | 4/1984 | Bartmann et al. |
| 4,537,948 A | 8/1985 | Bartmann et al. |
| 4,664,972 A | 5/1987 | Connolly |
| 4,769,424 A | 9/1988 | Takekoshi et al. |
| 4,794,164 A | 12/1988 | Iwasaki et al. |
| 5,110,896 A | 5/1992 | Waggoner et al. |
| 5,258,455 A | 11/1993 | Laughner et al. |
| 6,025,419 A | 2/2000 | Kasowski et al. |
| 6,096,821 A | 8/2000 | Adedeji et al. |
| 6,339,131 B1 * | 1/2002 | Cella et al. .................. 525/474 |
| 6,407,200 B1 | 6/2002 | Singh et al. |
| 6,444,779 B1 | 9/2002 | Singh et al. |
| 2003/0225221 A1 | 12/2003 | Beek et al. |
| 2008/0113138 A1 | 5/2008 | Pecak et al. |
| 2008/0312371 A1 | 12/2008 | Todt et al. |

FOREIGN PATENT DOCUMENTS

| | | |
|---|---|---|
| EP | 2169007 A1 | 4/2009 |
| GB | 1430615 A | 3/1976 |
| WO | 9808898 A1 | 3/1998 |
| WO | 03078526 A1 | 9/2003 |
| WO | 2005/105921 A1 | 11/2005 |

OTHER PUBLICATIONS

ASTM D1238-04c, Standard Test Method for Melt Flow Rates of Thermoplastics by Extrusion Plastometer, Published: Dec. 2004, 14 pages.
ASTM D256-06, Standard Test Method for Determining the Izod Pendulum Impact Resistance of Plastics, Published: Dec. 2006, 20 pages.
ASTM D 638-03, Standard Test Method for Tensile Properties of Plastics, Published: Jan. 2004, 15 pages.
ASTM D648-07, Standard Test Method for Deflection Temperature of Plastics Under Flexural Load in the Edgewise Position, Published: Mar. 2007, 13 pages.
ASTM D 790-07, Standard Test Methods for Flexural Properties of Unreinforced and Reinforced Plastics and Electrical Insulating Materials, Published: Oct. 2007, 11 pages.
CS 175296 English Translation, Published: Aug. 20, 1976, 4 pages.
CS 175309 English Translation, Published: Aug. 20, 1976.
CS 185025 English Tranlsation, Published: Dec. 30, 1977, 3 pages.
CS 187008 English Translation, Published: Apr. 28, 1978, 3 pages.
CS 226924 English Translation, Published: Jun. 24, 1983, 4 pages.
CS 227586 English Translation, Published: Nov. 12, 1982, 3 pages.
CS 229840 English Translation, Published: Dec. 13, 1982, 3 pages.
CS 256661 English Translation, Published: Jan. 16, 1989, 3 pages.
CS 275438 English Translation, Published: Apr. 11, 1991.
CS 275981 English Translation, Published: Jul. 16, 1991, 4 pages.
CS 298883 English Translation, Published: Dec. 15, 2004, 9 pages.
China Polyphenylene ether polyphenylene ether suppliers and manufacturers, Webpage, Downloaded Jul. 30, 2009, 1 page.
JP4059870 A; Feb. 26, 1991; Abstract Only (1 page).
International Search Report; International Application No. PCT/US2009/057612; International Filing Date Sep. 21, 2009; 5 pages.
Written Opinion of the International Searching Authority; International Application No. PCT/US2009/057612; International Filing Date Sep. 21, 2009; 6 pages.
European Patent Office, Application No. 10167965.2-2101, Dated: Nov. 17, 2010, 5 pages.

\* cited by examiner

*Primary Examiner* — Terressa Boykin
(74) *Attorney, Agent, or Firm* — Cantor Colburn LLP

(57) ABSTRACT

A poly(2,6-dimethyl-1,4-phenylene ether) prepared using a morpholine-containing polymerization catalyst has a monomodal molecular weight distribution with a reduced content of very high molecular weight species. It also exhibits increased morpholine incorporation in the high molecular weight fraction. Compared to commercially available poly(2, 6-dimethyl-1,4-phenylene ether) prepared using a di-n-butylamine-containing polymerization catalyst, the poly(2,6-dimethyl-1,4-phenylene ether) of the invention exhibits reduced odor. Compared to other poly(2,6-dimethyl-1,4-phenylene ether) prepared using a morpholine-containing polymerization catalyst, the poly(2,6-dimethyl-1,4-phenylene ether) of the invention exhibits improved molecular weight build during compounding and improved compatibilization with polyamides.

7 Claims, 4 Drawing Sheets

MORPHOLINE-SUBSTITUTED POLY(ARYLENE ETHER) AND METHOD FOR THE PREPARATION THEREOF

BACKGROUND OF THE INVENTION

Poly(arylene ether) resins are a class of plastics known for excellent water resistance, dimensional stability, and inherent flame retardancy, as well as high oxygen permeability and oxygen/nitrogen selectivity. Properties such as strength, stiffness, chemical resistance, and heat resistance can be tailored by blending poly(arylene ether) resins with various other plastics in order to meet the requirements of a wide variety of consumer products, for example, plumbing fixtures, electrical boxes, automotive parts, and insulation for wire and cable. The poly(arylene ether) most commonly used and widely commercially available is poly(2,6-dimethyl-1,4-phenylene ether).

Various odorous impurities that may be present in poly (arylene ether) resins have discouraged its adoption for odor-sensitive applications such as the molding of containers for food, cosmetics, and pharmaceuticals. One source of odors in poly(arylene ether) resins is di-n-butylamine, which is used as a component of the polymerization catalyst employed by the two largest manufacturers of poly(2,6-dimethyl-1,4-phenylene ether). The resulting poly(2,6-dimethyl-1,4-phenylene ether) resins can exhibit a di-n-butylamine-related odor from free di-n-butylamine impurities in the poly(2,6-dimethyl-1,4-phenylene ether). On the other hand, di-n-butylamine is also incorporated into the poly(2,6-dimethyl-1,4-phenylene ether) molecule as di-n-butylamino substituents, the thermal decomposition of which can provide a beneficial increase in poly(2,6-dimethyl-1,4-phenylene ether) molecular weight during compounding, as well as improved compatibilization of poly(2,6-dimethyl-1,4-phenylene ether) with incompatible resins such as polyamides.

One approach to reducing the odor of poly(2,6-dimethyl-1,4-phenylene ether) resins has been to utilize polymerization catalysts with less odorous amines. For example, proton nuclear magnetic resonance spectroscopy ($^1$H NMR) analysis of a poly(2,6-dimethyl-1,4-phenylene ether) obtained in China from Bluestar New Chemical Materials Co., Ruicheng Branch, China, indicates the presence of morpholino substituents and the absence of di-n-butylamino substituents. This analysis suggests that these poly(2,6-dimethyl-1,4-phenylene ether) resins are synthesized using a polymerization catalyst comprising morpholine rather than di-n-butylamine. Although the poly(2,6-dimethyl-1,4-phenylene ether) resins synthesized with a morpholine-containing catalyst exhibit reduced odor, they also exhibit undesirable reductions in their molecular weight increase during compounding and their compatibilization with resins such as polyamides. Thus, there remains a need for a poly(2,6-dimethyl-1,4-phenylene ether) which is synthesized without di-n-butylamine but which exhibits the molecular weight gain and compatibilization advantages of poly(2,6-dimethyl-1,4-phenylene ether) resins synthesized with di-n-butylamine.

BRIEF DESCRIPTION OF THE INVENTION

The above-described drawbacks are alleviated by a poly(2,6-dimethyl-1,4-phenylene ether), wherein a purified sample of poly(2,6-dimethyl-1,4-phenylene ether) prepared by dissolution of the poly(2,6-dimethyl-1,4-phenylene ether) in toluene, precipitation from methanol, reslurry, and isolation has a monomodal molecular weight distribution in the molecular weight range of 250 to 1,000,000 atomic mass units, and comprises less than or equal to 2.2 weight percent of poly(2,6-dimethyl-1,4-phenylene ether) having a molecular weight more than fifteen times the number average molecular weight of the entire purified sample; wherein the purified sample after separation into six equal poly(2,6-dimethyl-1,4-phenylene ether) weight fractions of decreasing molecular weight comprises a first, highest molecular weight fraction; and wherein the first, highest molecular weight fraction comprises at least 10 mole percent of poly(2,6-dimethyl-1,4-phenylene ether) comprising a terminal morpholine-substituted phenoxy group.

This and other embodiments are described in detail below.

DETAILED DESCRIPTION OF THE INVENTION

Figure 1:
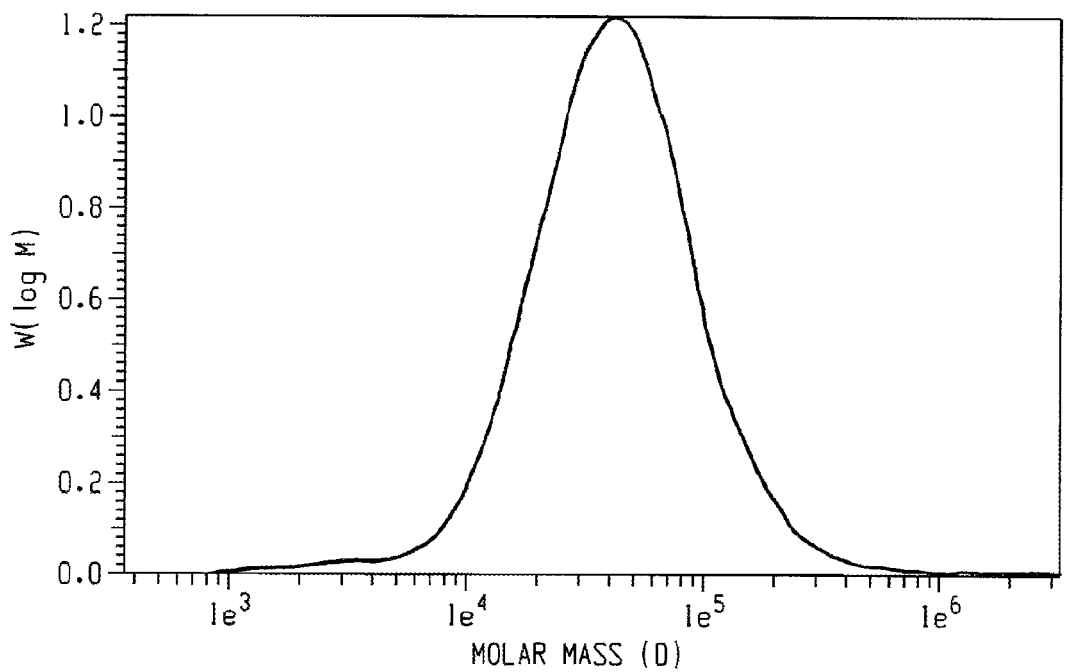
FIG. 1 is a plot of the molecular weight distribution for a purified sample of the poly(2,6-dimethyl-1,4-phenylene ether) prepared according to Example 2.

The present inventors have conducted research directed to the production of poly(2,6-dimethyl-1,4-phenylene ether) having reduced odor compared to such polymers synthesized using a dibutylamine-containing catalyst, but retaining the desirable physical and rheological properties of such polymers. Reduced odor was exhibited by a poly(2,6-dimethyl-1,4-phenylene ether) obtained in China from a commercial supplier and apparently synthesized with morpholine-containing catalyst (as indicated by proton nuclear magnetic resonance spectroscopy ($^1$H NMR)). However, this poly(2,6-dimethyl-1,4-phenylene ether) exhibited inferior extrusion properties and undesirably reduced molecular weight increase during compounding. It also exhibited an undesirably reduced ability to form compatibilized blends with polyamides. In their research, the present inventors have prepared a poly(2,6-dimethyl-1,4-phenylene ether) that exhibits desirable odor reduction while reducing or eliminating the undesirable physical, chemical, and rheological properties associated with known poly(2,6-dimethyl-1,4-phenylene ether) resins prepared with a morpholine-containing catalyst. Specifically, a purified sample of poly(2,6-dimethyl-1,4-phenylene ether) prepared by dissolution of the poly(2,6-dimethyl-1,4-phenylene ether) in toluene, precipitation from methanol, reslurry, and isolation, all as described in the working examples below, has a monomodal molecular weight distribution in the molecular weight range of 250 to 1,000,000 atomic mass units, and comprises less than or equal to 2.2 weight percent of poly(2,6-dimethyl-1,4-phenylene ether) having a molecular weight more than fifteen times the number average molecular weight of the entire purified sample (i.e., the purified sample as a whole). The present poly(2,6-dimethyl-1,4-phenylene ether) also exhibits increased morpholine incorporation into its high molecular weight polymer chains. Specifically, the purified sample of the present poly (2,6-dimethyl-1,4-phenylene ether), after separation into six fractions of equal poly(2,6-dimethyl-1,4-phenylene ether) weight content and decreasing molecular weight (as described in the working examples), comprises a first, highest molecular weight fraction comprising at least 10 mole percent of poly(2,6-dimethyl-1,4-phenylene ether) comprising a terminal morpholine-substituted phenoxy group. In other words, at least 10 percent of the molecules in the first, highest molecular weight fraction comprise a terminal morpholine-substituted phenoxy group.

Compared to known poly(2,6-dimethyl-1,4-phenylene ether) resins prepared with a morpholine-containing catalyst, the present poly(2,6-dimethyl-1,4-phenylene ether) exhibits reduced content of very high molecular weight species. This difference has practical significance because a high content of very high molecular weight species has been correlated with diminished performance in extrusion applications. The reduced content of very high molecular weight species can be objectively quantified in various ways. For example, as noted above, a purified sample prepared from the present poly(2,6-dimethyl-1,4-phenylene ether, comprises less than or equal to 2.2 weight percent of poly(2,6-dimethyl-1,4-phenylene ether) having a molecular weight more than fifteen times the number average molecular weight of the entire purified sample. In some embodiments, the purified sample comprises 0.1 to 2.2 weight percent, specifically 0.2 to 2 weight percent, of poly(2,6-dimethyl-1,4-phenylene ether) having a molecular weight more than fifteen times greater than the number average molecular weight of the entire purified sample. In some embodiments, the purified sample comprises less or equal to than 2.4 weight percent, specifically 0.5 to 2.4 weight percent, of poly(2,6-dimethyl-1,4-phenylene ether) having a molecular weight greater than seven times the peak molecular weight of the entire purified sample. In some embodiments, the purified sample comprises less than or equal to 3.2 weight percent, specifically 2 to 3.2 weight percent, of poly(2,6-dimethyl-1,4-phenylene ether) having a molecular weight greater than five times the peak molecular weight of the entire purified sample. As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(2,6-dimethyl-1,4-phenylene ether) molecular weight of the highest point in a plot of molecular weight on the x-axis versus absorbance on the y-axis. A detailed procedure for determining a molecular weight distribution using gel permeation chromatography is presented in the working examples.

Compared to known poly(2,6-dimethyl-1,4-phenylene ether) resins prepared with a morpholine-containing catalyst, the present poly(2,6-dimethyl-1,4-phenylene ether) exhibits increased morpholine incorporation into the high molecular weight species. This difference has practical significance because increased morpholine incorporation, and especially increased morpholine incorporation in the terminal position, has been observed to correlate with increased molecular weight build during compounding and improved compatibilization with polyamides. The increased morpholine incorporation can be objectively quantified in various ways. For example, as noted above, when the purified sample is separated into six fractions of equal poly(2,6-dimethyl-1,4-phenylene ether) weight content and decreasing molecular weight, the first, highest molecular weight fraction comprises at least ten mole percent of poly(2,6-dimethyl-1,4-phenylene ether) comprising a terminal morpholine-substituted phenoxy group. In other words, within the one-sixth of the purified sample molecular weight distribution having the highest molecular weight, at least ten mole percent of the poly(2,6-dimethyl-1,4-phenylene ether) comprises a terminal morpholine-substituted phenoxy group. In some embodiments, the first, highest molecular weight fraction comprises 10 to 40 mole percent of poly(2,6-dimethyl-1,4-phenylene ether) comprising a terminal morpholine-substituted phenoxy group.

Another advantage of the present poly(2,6-dimethyl-1,4-phenylene ether) is that it incorporates terminal morpholine residues more uniformly into both low and high molecular weight poly(2,6-dimethyl-1,4-phenylene ether). In contrast, prior art poly(2,6-dimethyl-1,4-phenylene ether) resins tend to exhibit a strong bias toward incorporation of terminal morpholine residues into lower molecular weight poly(2,6-dimethyl-1,4-phenylene ether). Again, this has practical significance in that the present poly(2,6-dimethyl-1,4-phenylene ether) exhibits increased molecular weight build during compounding and improved compatibilization with polyamides. The dependence of terminal morpholine incorporation on molecular weight is objectively characterized by separating the purified sample of poly(2,6-dimethyl-1,4-phenylene ether) by molecular weight into six equal poly(2,6-dimethyl-1,4-phenylene ether) weight fractions and calculating the ratio of the terminal morpholine content of the sixth, lowest molecular weight fraction to the terminal morpholine content of the first, highest molecular weight fraction. Specifically, after separating the purified poly(2,6-dimethyl-1,4-phenylene ether) into six fractions of equal poly(2,6-dimethyl-1,4-phenylene ether) weight content and decreasing molecular weight, the ratio of the sixth, lowest molecular weight fraction mole percent of poly(2,6-dimethyl-1,4-phenylene ether) comprising a terminal morpholine-substituted phenoxy group to the first, highest molecular weight fraction mole percent of poly(2,6-dimethyl-1,4-phenylene ether) comprising a terminal morpholine-substituted phenoxy group is less than or equal to 4, specifically 1 to 4, more specifically 1 to 3, still more specifically 1 to 2.

In some embodiments, the first, highest molecular weight fraction comprises wherein 10 to 40 mole percent of poly(2,6-dimethyl-1,4-phenylene ether) comprising a terminal morpholine-substituted phenoxy group; and the purified sample of the poly(2,6-dimethyl-1,4-phenylene ether) comprises 0.1 to 2.2 weight percent of poly(2,6-dimethyl-1,4-phenylene ether) having a molecular weight more than fifteen times greater than the number average molecular weight of the entire purified sample as a whole.

The invention includes methods of preparing the poly(2,6-dimethyl-1,4-phenylene ether) described herein. For example, one embodiment is a method of preparing a poly(2,6-dimethyl-1,4-phenylene ether), comprising: polymerizing 2,6-dimethylphenol in a reaction mixture to form a product mixture comprising solid poly(2,6-dimethyl-1,4-phenylene ether); wherein the reaction mixture comprises the 2,6-dimethylphenol, a catalyst comprising copper and morpholine, a solvent for the poly(2,6-dimethyl-1,4-phenylene ether), and a non-solvent for the poly(2,6-dimethyl-1,4-phenylene ether); wherein at least a portion of the 2,6-dimethylphenol is added to the reaction mixture during the course of the polymerization (i.e., the reaction is conducted in semi-batch mode, at least with regard to addition of 2,6-dimethylphenol, as contrasted with a batch reaction in which all of the 2,6-dimethylphenol is present in the reaction at the initiation of polymerization); contacting the product mixture with an aqueous chelant solution, thereby inducing a liquid-liquid phase separation that yields a chelation mixture comprising solid poly(2,6-dimethyl-1,4-phenylene ether), an aqueous phase comprising chelated copper, and an organic phase comprising oligomeric poly(2,6-dimethyl-1,4-phenylene ether); separating the solid poly(2,6-dimethyl-1,4-phenylene ether) from the chelation mixture; and recycling to the reactor at least a portion of the organic phase comprising oligomeric poly(2,6-dimethyl-1,4-phenylene ether). The oligomeric poly(2,6-dimethyl-1,4-phenylene ether) is defined herein as comprising 2,6-dimethyl-1,4-phenylene ether repeat units and having a number average molecular weight of 250 to 6,000 atomic mass units. In some cases, the oligomeric poly(2,6-dimethyl-1,4-phenylene ether) comprises a polymerization catalyst moiety (in which case it is "living" oligomer). In other cases, the oligomeric poly(2,6-dimethyl-1,4-phenylene ether) is essentially free of polymerization catalyst moiety (in which case it is "dead" oligomer). Although the method described above includes an oligomer recycling step, the poly(2,6-dimethyl-1,4-phenylene ether) can also be synthesized without recycling oligomeric poly(2,6-dimethyl-1,4-phenylene ether) to the reactor. Specific procedures for synthesizing and isolating the poly(2,6-dimethyl-1,4-phenylene ether) are described in the working examples below.

Another embodiment is a method of preparing a poly(2,6-dimethyl-1,4-phenylene ether), comprising: polymerizing 2,6-dimethylphenol in a reaction mixture to form a product mixture comprising a solid poly(2,6-dimethyl-1,4-phenylene ether); wherein the reaction mixture comprises the 2,6-dimethylphenol, a catalyst comprising copper and morpholine, a solvent for the poly(2,6-dimethyl-1,4-phenylene ether), and a non-solvent for the poly(2,6-dimethyl-1,4-phenylene ether); wherein at least a portion of the 2,6-dimethylphenol is added to the reaction mixture during the course of the polymerization, and wherein the reaction mixture prior to initiating polymerizing the 2,6-dimethylphenol comprises 0.05 to 15 parts by weight of oligomeric poly(2,6-dimethyl-1,4-phenylene ether) per 100 parts by weight of the solvent for the poly(2,6-dimethyl-1,4-phenylene ether). In this embodiment, the oligomeric poly(2,6-dimethyl-1,4-phenylene ether) is typically present in a recycled solvent comprising 0.05 to 15 weight percent of oligomeric poly(2,6-dimethyl-1,4-phenylene ether), based on the total weight of recycled solvent.

Another embodiment is a method of preparing a poly(2,6-dimethyl-1,4-phenylene ether), comprising: polymerizing 2,6-dimethylphenol in a reaction mixture to form a product mixture comprising a solid poly(2,6-dimethyl-1,4-phenylene ether); wherein the reaction mixture comprises the 2,6-dimethylphenol, a catalyst comprising copper and morpholine, a solvent for the poly(2,6-dimethyl-1,4-phenylene ether), and a non-solvent for the poly(2,6-dimethyl-1,4-phenylene ether); wherein at least a portion of the 2,6-dimethylphenol is added to the reaction mixture during the course of the polymerization; and wherein reaction mixture prior to initiating polymerizing the 2,6-dimethylphenol comprises 0.05 to 15 parts by weight percent of dissolved oligomeric poly(2,6-dimethyl-1,4-phenylene ether) per 100 parts by weight of the solvent for the poly(2,6-dimethyl-1,4-phenylene ether). In this embodiment, the dissolved oligomeric poly(2,6-dimethyl-1,4-phenylene ether) is typically present in a recycled solvent comprising 0.05 to 15 weight percent of oligomeric poly(2,6-dimethyl-1,4-phenylene ether), based on the total weight of recycled solvent.

Another embodiment is a method of preparing a poly(2,6-dimethyl-1,4-phenylene ether), comprising: polymerizing 2,6-dimethylphenol in a reaction mixture to form a product mixture comprising a solid poly(2,6-dimethyl-1,4-phenylene ether); wherein the reaction mixture comprises the 2,6-dimethylphenol, a catalyst comprising copper and morpholine, a solvent for the poly(2,6-dimethyl-1,4-phenylene ether), and a non-solvent for the poly(2,6-dimethyl-1,4-phenylene ether); wherein at least a portion of the 2,6-dimethylphenol is added to the reaction mixture during the course of the polymerization; wherein the reaction mixture prior to initiating polymerizing the 2,6-dimethylphenol comprises 0.05 to 15 parts by weight of dissolved oligomeric poly(2,6-dimethyl-1,4-phenylene ether) per 100 parts by weight of the solvent for the poly(2,6-dimethyl-1,4-phenylene ether); and wherein the oligomeric poly(2,6-dimethyl-1,4-phenylene ether) is essentially free of polymerization catalyst moiety. In this context, "essentially free" means that the oligomeric poly(2,6-dimethyl-1,4-phenylene ether) does not comprise polymerization catalyst moiety in an amount effective to induce polymerization. Typically, the oligomeric poly(2,6-dimethyl-1,4-phenylene ether) comprises polymerization catalyst moiety in an amount less than 2 parts per thousand by weight, specifically less than or equal to 1 part per thousand by weight, based on the weight of the oligomeric poly(2,6-dimethyl-1,4-phenylene ether).

Another embodiment is a method of preparing a poly(2,6-dimethyl-1,4-phenylene ether), comprising: polymerizing 2,6-dimethylphenol in a reaction mixture to form a product mixture comprising solid poly(2,6-dimethyl-1,4-phenylene ether); wherein the reaction mixture comprises the 2,6-dimethylphenol, a catalyst comprising copper and morpholine, a solvent for the poly(2,6-dimethyl-1,4-phenylene ether), and a non-solvent for the poly(2,6-dimethyl-1,4-phenylene ether); wherein at least a portion of the 2,6-dimethylphenol is added to the reaction mixture during the course of the polymerization; wherein the reaction mixture prior to initiating polymerizing the 2,6-dimethylphenol comprises 0.05 to 15 parts by weight of dissolved oligomeric poly(2,6-dimethyl-1,4-phenylene ether) per 100 parts by weight of the solvent for the poly(2,6-dimethyl-1,4-phenylene ether); wherein the oligomeric poly(2,6-dimethyl-1,4-phenylene ether) is essentially free of polymerization catalyst moiety; and wherein the dissolved oligomeric poly(2,6-dimethyl-1,4-phenylene ether) has a number average molecular weight less than 4000 atomic mass units. In this context, "essentially free" means that the oligomeric poly(2,6-dimethyl-1,4-phenylene ether) does not comprise polymerization catalyst moiety in an amount effective to induce polymerization. Typically, the oligomeric poly(2,6-dimethyl-1,4-phenylene ether) comprises polymerization catalyst moiety in an amount less than 2 parts per thousand by weight, specifically less than or equal to 1 part per thousand by weight, based on the weight of the oligomeric poly(2,6-dimethyl-1,4-phenylene ether).

Another embodiment is a method of preparing a poly(2,6-dimethyl-1,4-phenylene ether), comprising: polymerizing 2,6-dimethylphenol in a reaction mixture to form a product mixture comprising solid poly(2,6-dimethyl-1,4-phenylene ether); wherein the reaction mixture comprises the 2,6-dimethylphenol, a catalyst comprising copper and morpholine, a solvent for the poly(2,6-dimethyl-1,4-phenylene ether), and a non-solvent for the poly(2,6-dimethyl-1,4-phenylene ether); wherein at least a portion of the 2,6-dimethylphenol is added to the reaction mixture in a substantially pure (e.g., at least 98 weight percent pure) molten state during the course of the polymerization; and wherein the reaction mixture prior to initiating polymerizing the 2,6-dimethylphenol comprises 0.05 to 15 parts by weight of dissolved oligomeric poly(2,6-dimethyl-1,4-phenylene ether) per 100 parts by weight of the solvent for the poly(2,6-dimethyl-1,4-phenylene ether).

Another embodiment is a method of preparing a poly(2,6-dimethyl-1,4-phenylene ether), comprising: polymerizing 2,6-dimethylphenol in a reaction mixture to form a product mixture comprising solid poly(2,6-dimethyl-1,4-phenylene ether); wherein the reaction mixture comprises the 2,6-dimethylphenol, a catalyst comprising copper and morpholine, a solvent for the poly(2,6-dimethyl-1,4-phenylene ether), and a non-solvent for the poly(2,6-dimethyl-1,4-phenylene ether); wherein at least a portion of the 2,6-dimethylphenol is added to the reaction mixture in a substantially pure (e.g., at least 98 weight percent pure) molten state during the course of the polymerization; wherein the reaction mixture prior to initiating polymerizing the 2,6-dimethylphenol comprises 0.05 to 15 parts by weight of dissolved oligomeric poly(2,6-dimethyl-1,4-phenylene ether) per 100 parts by weight of the solvent for the poly(2,6-dimethyl-1,4-phenylene ether); wherein the oligomeric poly(2,6-dimethyl-1,4-phenylene ether) is essentially free of polymerization catalyst moiety; and wherein the dissolved oligomeric poly(2,6-dimethyl-1,4-phenylene ether) has a number average molecular weight of 250 to 4000 atomic mass units. In this context, "essentially free" means that the oligomeric poly(2,6-dimethyl-1,4-phenylene ether) does not comprise polymerization catalyst moiety in an amount effective to induce polymerization. Typically, the oligomeric poly(2,6-dimethyl-1,4-phenylene ether) comprises polymerization catalyst moiety in an amount less than 2 parts per thousand by weight, specifically less than or equal to 1 part per thousand by weight, based on the weight of the oligomeric poly(2,6-dimethyl-1,4-phenylene ether).

In all of the above embodiments in which the reaction mixture prior to initiating polymerizing the 2,6-dimethylphenol comprises 0.05 to 15 parts by weight of oligomeric poly(2,6-dimethyl-1,4-phenylene ether) per 100 parts by weight of the solvent for the poly(2,6-dimethyl-1,4-phenylene ether, the amount of the oligomeric poly(2,6-dimethyl-1,4-phenylene ether) can be specifically 0.05 to 10 parts by weight, more specifically 0.05 to 5 parts by weight.

The current inventors unexpectedly found that the presence of oligomeric poly(2,6-dimethyl-1,4-phenylene ether) in the reaction mixture prior to initiation polymerization did not result in the formation of a high molecular weight shoulder in the molecular weight distribution of the product poly(2,6-dimethyl-1,4-phenylene ether). While not wishing to be bound by any particular theory, the present inventors speculate that the high molecular weight shoulder present in the Comparative Example 4 of the working examples below may be due to recycling to the reactor of "living" oligomer, that is, oligomer to which copper catalyst is still bound. This living oligomer can then further polymerize to form a fraction of poly(2,6-dimethyl-1,4-phenylene ether) with exceptionally high molecular weight compared to poly(2,6-dimethyl-1,4-phenylene ether) synthesized from 2,6-dimethylphenol alone (i.e., without living oligomer initially present). By contacting the full product mixture—not just the solid poly(2,6-dimethyl-1,4-phenylene ether)—with the aqueous chelant solution, the present method avoids the formation of the very high molecular weight fraction that detracts from performance in applications such as extrusion molding.

The invention includes at least the following embodiments.

Embodiment 1

A poly(2,6-dimethyl-1,4-phenylene ether), wherein a purified sample of poly(2,6-dimethyl-1,4-phenylene ether) prepared by dissolution of the poly(2,6-dimethyl-1,4-phenylene ether) in toluene, precipitation from methanol, reslurry, and isolation has a monomodal molecular weight distribution in the molecular weight range of 250 to 1,000,000 atomic mass units, and comprises less than or equal to 2.2 weight percent of poly(2,6-dimethyl-1,4-phenylene ether) having a molecular weight more than fifteen times the number average molecular weight of the entire purified sample; wherein the purified sample after separation into six equal poly(2,6-dimethyl-1,4-phenylene ether) weight fractions of decreasing molecular weight comprises a first, highest molecular weight fraction; and wherein the first, highest molecular weight fraction comprises at least 10 mole percent of poly(2,6-dimethyl-1,4-phenylene ether) comprising a terminal morpholine-substituted phenoxy group.

Embodiment 2

The poly(2,6-dimethyl-1,4-phenylene ether) of embodiment 1, wherein the purified sample comprises less or equal to 2.4 weight percent of poly(2,6-dimethyl-1,4-phenylene ether) having a molecular weight greater than seven times the peak molecular weight of the entire purified sample.

Embodiment 3

The poly(2,6-dimethyl-1,4-phenylene ether) of embodiment 1 or 2, wherein the purified sample comprises less than or equal to 3.2 weight percent of poly(2,6-dimethyl-1,4-phenylene ether) having a molecular weight greater than five times the peak molecular weight of the entire purified sample.

Embodiment 4

The poly(2,6-dimethyl-1,4-phenylene ether) of any of embodiments 1-3, wherein the first, highest molecular weight fraction comprises 10 to 40 mole percent of poly(2,6-dimethyl-1,4-phenylene ether) comprising a terminal morpholine-substituted phenoxy group.

Embodiment 5

The poly(2,6-dimethyl-1,4-phenylene ether) of any of embodiments 1-4, wherein the purified sample comprises 0.1 to 2.2 weight percent of poly(2,6-dimethyl-1,4-phenylene ether) having a molecular weight more than fifteen times greater than the number average molecular weight of the entire purified sample.

Embodiment 6

The poly(2,6-dimethyl-1,4-phenylene ether) of any of embodiments 1-3, wherein the first, highest molecular weight fraction comprises 10 to 40 mole percent of poly(2,6-dimethyl-1,4-phenylene ether) comprising a terminal morpholine-substituted phenoxy group; and wherein the purified sample comprises 0.1 to 2.2 weight percent of poly(2,6-dimethyl-1,4-phenylene ether) having a molecular weight more than fifteen times greater than the number average molecular weight of the entire purified sample.

Embodiment 7

The poly(2,6-dimethyl-1,4-phenylene ether) of embodiment 1, wherein the purified sample after separation into six equal poly(2,6-dimethyl-1,4-phenylene ether) weight fractions of decreasing molecular weight comprises a first, highest molecular weight fraction characterized by a first fraction mole percent of poly(2,6-dimethyl-1,4-phenylene ether) comprising a terminal morpholine-substituted phenoxy group, and a sixth, lowest molecular weight fraction characterized by a sixth fraction mole percent of poly(2,6-dimethyl-1,4-phenylene ether) comprising a terminal morpholine-substituted phenoxy group, and wherein a ratio of the sixth fraction mole percent of poly(2,6-dimethyl-1,4-phenylene ether) comprising a terminal morpholine-substituted phenoxy group to the first fraction mole percent of poly(2,6-dimethyl-1,4-phenylene ether) comprising a terminal morpholine-substituted phenoxy group is less than or equal to 4.

The invention is further illustrated by the following non-limiting examples.

Comparative Example 1

This comparative example describes the batch synthesis of poly(2,6-dimethyl-1,4-phenylene ether) in a mixture of a solvent for the poly(2,6-dimethyl-1,4-phenylene ether) (toluene) and a nonsolvent for the poly(2,6-dimethyl-1,4-phenylene ether) (methanol). The polymerization catalyst was prepared from a copper salt ($CuCl_2 2H_2O$) and a secondary amine(morpholine). The end-of-reaction mixture was a slurry that was treated with citric acid to chelate the copper ion. Other chelants known in the art can also be used, including ethylenediaminetetracetic acid and its salts, and nitrilotriacetic acid and its salts.

The polymerization was conducted on a laboratory scale. The apparatus consisted of a bubbling reactor (Mettler Toledo RC1e reactor, Type 3, 1.8 liter, 100 bar) equipped with a stirrer, temperature control system, nitrogen padding, oxygen bubbling tube, and computerized control system (including two RD10 controllers). There were also two separate feeding ports and pumps for dosing reactants into the reactor. The test batches running conditions for Examples 1-3 and Comparative Examples 1-3 are summarized in Table 1. The raw materials used are summarized in Table 2.

TABLE 1

|  | C. Ex. 1 | Ex. 1 | C. Ex. 2 | C. Ex. 3 | Ex. 2 | Ex. 3 |
| --- | --- | --- | --- | --- | --- | --- |
| Feed | Batch | Semi-batch | Batch | Batch | Semi-batch | Semi-batch |
| Oligomers | No | No | Yes | Yes | No | Yes |
| Reaction time, min | 55 | 55 | 55 | 40 | 45 | 45 |
| Temperature, C. | 40 | 40 | 40 | 40 | 40 | 40 |
| Toluene, g | 312.03 | 312.03 | 312.03 | 312.03 | 312.03 | 312.03 |
| Nitrogen, sccm | 1220 | 1220 | 1220 | 1220 | 1220 | 1220 |
| Oxygen, sccm | 500 | 500 | 500 | 500 | 500 | 500 |
| Mol O/mol Monomer fed | NA* | 1.01 | NA | NA | 1.01 | 1.01 |
| Morpholine, g | 68.01 | 68.01 | 68.01 | 68.01 | 68.01 | 68.01 |
| Catalyst: |  |  |  |  |  |  |
| $CuCl_2 \cdot 2H_2O$, g | 1.12 | 1.12 | 1.12 | 1.12 | 1.12 | 1.12 |
| Methanol, g | 1.13 | 1.13 | 1.13 | 1.13 | 1.13 | 1.13 |
| Methanol, g | 307.43 | 307.43 | 307.43 | 307.43 | 307.43 | 307.43 |
| Monomer: |  |  |  |  |  |  |
| 2,6-dimethylphenol, g | 187.67 | 187.67 | 187.67 | 187.67 | 187.67 | 187.67 |
| Toluene, g | 187.67 | 187.67 | 187.67 | 187.67 | 187.67 | 187.67 |
| PPE Oligomers, wt % of total Toluene | 0 | 0 | 1 | 1 | 0 | 1 |

*NA = not applicable (all monomer initially present)

TABLE 2

| Raw Material | CAS Reg. No. | Source |
| --- | --- | --- |
| 2,6-dimethylphenol | 576-26-1 | SABIC Innovative Plastics |
| Morpholine | 110-91-8 | Fisher Scientific |
| CuCl2•2H2O | 10125-13-0 | Fisher Scientific |

TABLE 2-continued

| Raw Material | CAS Reg. No. | Source |
| --- | --- | --- |
| Toluene | 108-88-3 | Sunoco |
| Methanol | 67-56-1 | SABIC Americas |
| Citric acid | 77-92-9 | International Chemical Inc. |
| PPE Oligomer | 25134-01-4 | SABIC Innovative Plastics |

The reactor was loaded with 312.03 grams of toluene and the contents were stirred under nitrogen atmosphere. The temperature was maintained at 40° C. Morpholine (68.01 grams) was added to the reactor and mixed for 5 minutes, followed by addition of a cupric chloride solution in methanol. The cupric chloride solution was prepared by mixing 1.12 grams $CuCl_2 2H_2O$ with 1.13 grams methanol with addition of this mixture to 307.43 grams methanol. After mixing the above-mentioned components for 5 minutes, 375.33 grams of a 50% solution of 2,6-dimethylphenol in toluene was added. Oxygen gas was bubbled into the reactor to carry out the polymerization. Oxygen flow was maintained for 55 minutes, at which point the oxygen flow was stopped and the reactor contents were transferred to a vessel containing 2.5 grams citric acid in 3.8 grams methanol. The solution was stirred at 45° C. for 45 minutes and the liquid phase was removed by filtration. The remaining wet cake was washed (rinsed) with a solution of 64 grams toluene and 168 grams methanol at ambient temperature (defined as 23±3° C.), and filtered again. The wet cake was washed (rinsed) with 319 grams methanol at similar ambient temperature, filtered, and dried in a vacuum oven at 110° C. to obtain dry powder ("isolated poly(2,6-dimethyl-1,4-phenylene ether)"). The characterization of this sample is summarized in Table 3.

The isolated poly(2,6-dimethyl-1,4-phenylene ether) was further purified to form a purified sample as follows. The isolated poly(2,6-dimethyl-1,4-phenylene ether) was dissolved in toluene at ambient temperature at 25 weight percent solids to form a poly(2,6-dimethyl-1,4-phenylene ether) solution. The poly(2,6-dimethyl-1,4-phenylene ether) was precipitated by adding 1 weight part of the poly(2,6-dimethyl-1, 4-phenylene ether) solution at ambient temperature to 2 weight parts of methanol at ambient temperature, filtering the wet cake, reslurrying the wetcake in methanol (again, using 2 weight parts of methanol at ambient temperature), filtering again, and drying in a vacuum oven for 1 hour at 110° C. to obtain a purified sample of poly(2,6-dimethyl-1,4-phenylene ether). Characterization of the purified sample is summarized in Table 4.

Example 1

The method of Comparative Example 1 was repeated, except that the 50% solution of 2,6-dimethylphenol in toluene was not added to the bubbling reactor before oxygen gas addition, but was instead fed to the reactor at a rate of 10.7 grams/minute concurrently with the oxygen addition. This gradual addition of monomer during the course of polymerization is the process characteristic summarized as "semi-batch" in the Table 1 row labeled "Feed". In contrast, this aspect of Comparative Example 1 is characterized as "batch" because all 2,6-dimethylphenol was present when the polymerization was initiated with introduction of oxygen gas.

Comparative Example 2

The method of Comparative Example 1 was repeated with two exceptions. The first exception was that the material added to the bubbling reactor before the start of oxygen gas addition also contained 5 grams of poly(2,6-dimethyl-1,4-phenylene ether) oligomer. This oligomer was derived from the liquid phase of a previous polymerization, and it is a "dead" oligomer in the sense that the entire polymerization product mixture was subjected to chelation to remove copper ion. In other words, the poly(2,6-dimethyl-1,4-phenylene ether) oligomer was essentially free of polymerization catalyst moiety. The number average molecular weight of the oligomer, as measured by GPC against polystyrene standards, was 886 atomic mass units, and the weight average molecular weight was 1873 atomic mass units. The second exception was that at the end of the 45 minutes of mixing at 45° C. after adding citric acid solution, the liquid phase of reaction mixture was removed by filtration. The remaining wet cake was reslurried (not just rinsed) with a solution of 64 grams toluene and 168 grams methanol at ambient temperature and filtered again. The obtained wet cake was reslurried again (not rinsed) with 319 grams methanol at ambient temperature, filtered, and dried in a vacuum oven at 110° C. to obtain dry powder. The characterization of this sample is summarized in Table 3. The product was further purified by dissolving the dry powder in toluene at 25 weight percent solids, precipitating by mixing in 2 weight parts of methanol per 1 weight part of the 25 weight percent solution at ambient temperature, filtering the wet cake, reslurrying the wetcake in methanol (again, with 2 weight parts of methanol), filtering again, and drying in a vacuum oven for 1 hour at 110° C. to obtain a purified sample of poly(2,6-dimethyl-1,4-phenylene ether). The characterization of the purified sample is summarized in Table 4.

Comparative Example 3

The method of Comparative Example 2 was repeated, except that the total reaction time (oxygen addition time) was decreased from 55 minutes to 40 minutes.

Example 2

The method of Example 1 was repeated with two exceptions. The first exception was that the total reaction time (oxygen addition time) was decreased from 55 minutes to 45 minutes. The second exception was that at the end of the 45 minutes of mixing at 45° C. after adding citric acid solution, the liquid phase of the reaction mixture was removed by filtration. The remaining wet cake was reslurried (not just rinsed) with a solution of 64 grams toluene and 168 grams methanol at ambient temperature, and filtered again. The obtained wet cake was reslurried again (not rinsed) with 319 grams methanol at ambient temperature, filtered, and dried in a vacuum oven at 110° C. to obtain a dry powder (isolated poly(2,6-dimethyl-1,4-phenylene ether). The characterization of the isolated poly(2,6-dimethyl-1,4-phenylene ether) is summarized in Table 3.

The isolated poly(2,6-dimethyl-1,4-phenylene ether) was further purified by dissolving the dry powder in toluene at 25 weight percent solids, precipitating by mixing in 2 weight parts of methanol per 1 weight part of the 25 weight percent solution at ambient temperature, filtering the wet cake, reslurrying the wetcake in methanol (again, with 2 weight parts methanol), filtering again, and drying in a vacuum oven for 1 hour at 110° C. to obtain a purified sample of poly(2,6-dimethyl-1,4-phenylene ether). The characterization of the purified sample is summarized in Table 4.

Example 3

The method of Example 2 was repeated, except that all toluene solutions (i.e., the initial toluene charge and the 2,6-dimethylphenol solution) added to the bubbling reactor also contained 1% by weight, based on total toluene, of the poly (2,6-dimethyl-1,4-phenylene ether) oligomer described in Comparative Example 2.

Comparative Example 4

Comparative Example 4 is a poly(2,6-dimethyl-1,4-phenylene ether) obtained in China as grade LXR040 from Bluestar New Chemical Materials Co., Ruicheng Branch, China. This commercial sample was first analyzed as received and its characterization is summarized in Table 3. The commercially-obtained powder sample was further purified to form a purified sample by dissolving the dry powder in toluene at 25 weight percent solids, precipitating by mixing in 2 weight parts of methanol with 1 weight part of the 25 weight percent solution at ambient temperature, filtering the wet cake, reslurrying the wetcake in methanol (again, with 2 weight parts methanol), filtering again, and drying in a vacuum oven for 1 hour at 110° C. to obtain a purified sample of poly(2,6-dimethyl-1,4-phenylene ether). The characterization of the purified sample is summarized in Table 4.

Product Analysis

Figure 2:
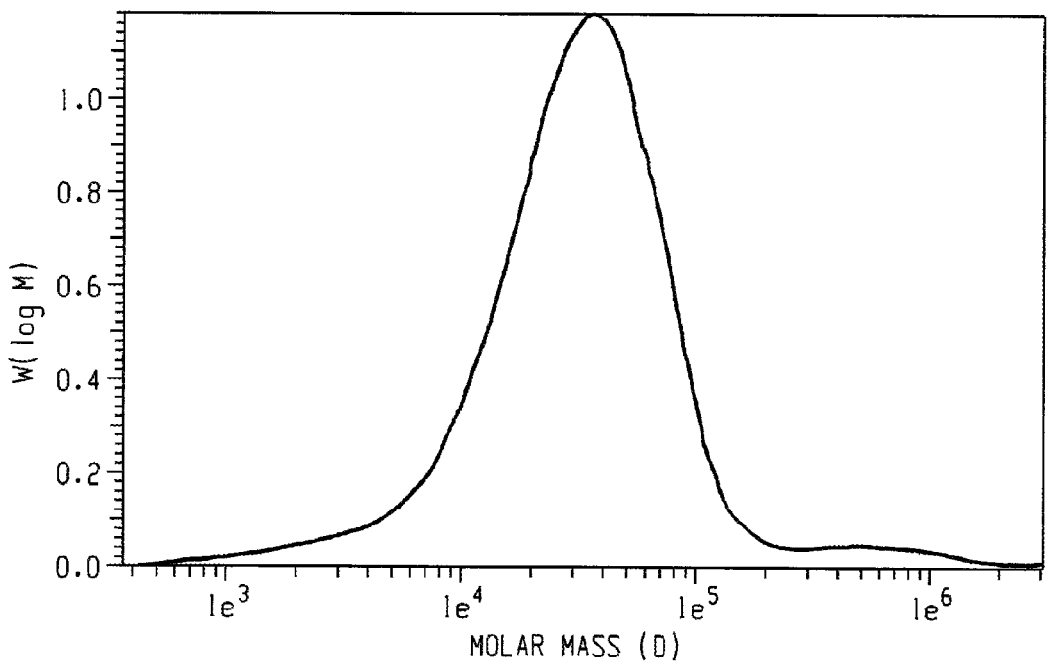
FIG. 2 is a plot of the molecular weight distribution for a purified sample of a commercially obtained poly(2,6-dimethyl-1,4-phenylene ether) solid powder designated Comparative Example 4.

For each of the poly(2,6-dimethyl-1,4-phenylene ether) resins associated with the working examples above, intrinsic viscosity was determined by Ubbelohde-type viscometer at 25° C. Molecular weight was determined by gel permeation chromatography (GPC) relative to polystyrene standards using UV detection at 280 nanometers wavelength. Molecular structure was determined by proton nuclear magnetic resonance spectroscopy ($^1$H NMR). The results are summarized in Tables 3 and 4. The molecular weight distribution for the purified sample derived from the poly(2,6-dimethyl-1,4-phenylene ether) prepared according to Example 2 is shown in FIG. 1. The molecular weight distribution for the purified sample derived from the poly(2,6-dimethyl-1,4-phenylene ether) prepared of Comparative Example 4 is shown in FIG. 2. Table 3 lists data for the dry powders obtained after the first two washes of Examples 1-3 and Comparative Examples 1-3, and for the Comparative Example 4 sample as received (that is, data in this table is for the respective poly(2,6-dimethyl-1,4-phenylene ether) resins before they were redissolved/reprecipitated/reslurried/isolated). Table 4 lists data for the purified samples. In the tables, "IV" signifies intrinsic viscosity in units of deciliters per gram (dL/g); "$M_n$" signifies number average molecular weight in units of atomic mass units (AMU); "$M_w$," signifies weight average molecular weight in units of AMU; "D ($M_w/M_n$)" signifies the polydispersity, which is the ratio of weight average molecular weight to number average molecular weight; "$M_p$" signifies the peak molecular weight, which is the molecular weight at the peak of the GPC chromatogram in units of AMU; "%<500K" signifies the weight percent of the total sample that has molecular weight less than 500,000 AMU; "$M_w/M_p$" signifies the ratio of weight average molecular weight to peak molecular weight; "$M_p/M_n$" signifies the ratio of peak molecular weight to number average molecular weight; "Monomodal from 250 to 1,000,000 AMU?" signifies whether the molecular weight distribution from 250 to 1,000,000 AMU is monomodal (i.e., whether the plot of molar mass (x-axis) versus UV light absorbance ("W(log M)"; (y-axis) has one and only one maximum point with a slope of zero); "Frac $M_n$/Bulk $M_n$" signifies, for a given fraction, the ratio of the fraction's number average molecular weight to the whole sample's number average molecular weight; "Frac $M_w$/Bulk $M_w$" signifies, for a given fraction, the ratio of the fraction's weight average molecular weight to the whole sample's weight average molecular weight; "wt % MW≧15×$M_n$" signifies the weight percent of the whole sample or fraction (depending on the row in Table 4) having a molecular weight greater than 15 times the number average molecular weight of the whole sample; "wt % MW≧5×$M_p$" signifies the weight percent of the whole sample or fraction having a molecular weight greater than five times the peak molecular weight of the whole sample; "wt % MW≧7×$M_p$" signifies the weight percent of the whole sample or fraction having a molecular weight greater than seven times the peak molecular weight of the whole sample. Data in the remaining columns of Table 4 was obtained by $^1$H NMR: "wt % Term. Morph" signifies weight of bound morpholine in the hydroxide-functionalized end of the poly(2,6-dimethyl-1,4-phenylene ether), expressed as weight percent of morpholino ($C_4H_8NO$) groups relative to the total weight of the poly(2,6-dimethyl-1,4-phenylene ether); "mol % Int. Morph" signifies the moles of internally-bound morpholino groups relative to the moles of poly(2,6-dimethyl-1,4-phenylene ether) chains; "mol % Term. Morph" signifies the moles of bound morpholine units in the hydroxide-functionalized end of the poly(2,6-dimethyl-1,4-phenylene ether) molecule relative to the moles of poly(2,6-dimethyl-1,4-phenylene ether) chains; "mol % Int. Biph" signifies the moles of internally bound 2,2',6,6'-tetramethyl-4,4'-biphenoxy units as percent of moles of poly(2,6-dimethyl-1,4-phenylene ether) chains; "Term./Int. Morph" signifies "mol % Term. Morph" divided by "mol % Int. Morph"; "Term6/Term1" signifies the "mol % Term. Morph" for fraction 6 divided by the mol % Term. Morph" for fraction 1 of the same sample. "Mono" signifies whether the molecular weight distribution from 250 to 1,000,000 atomic mass units is monomodal.

Figure 3:
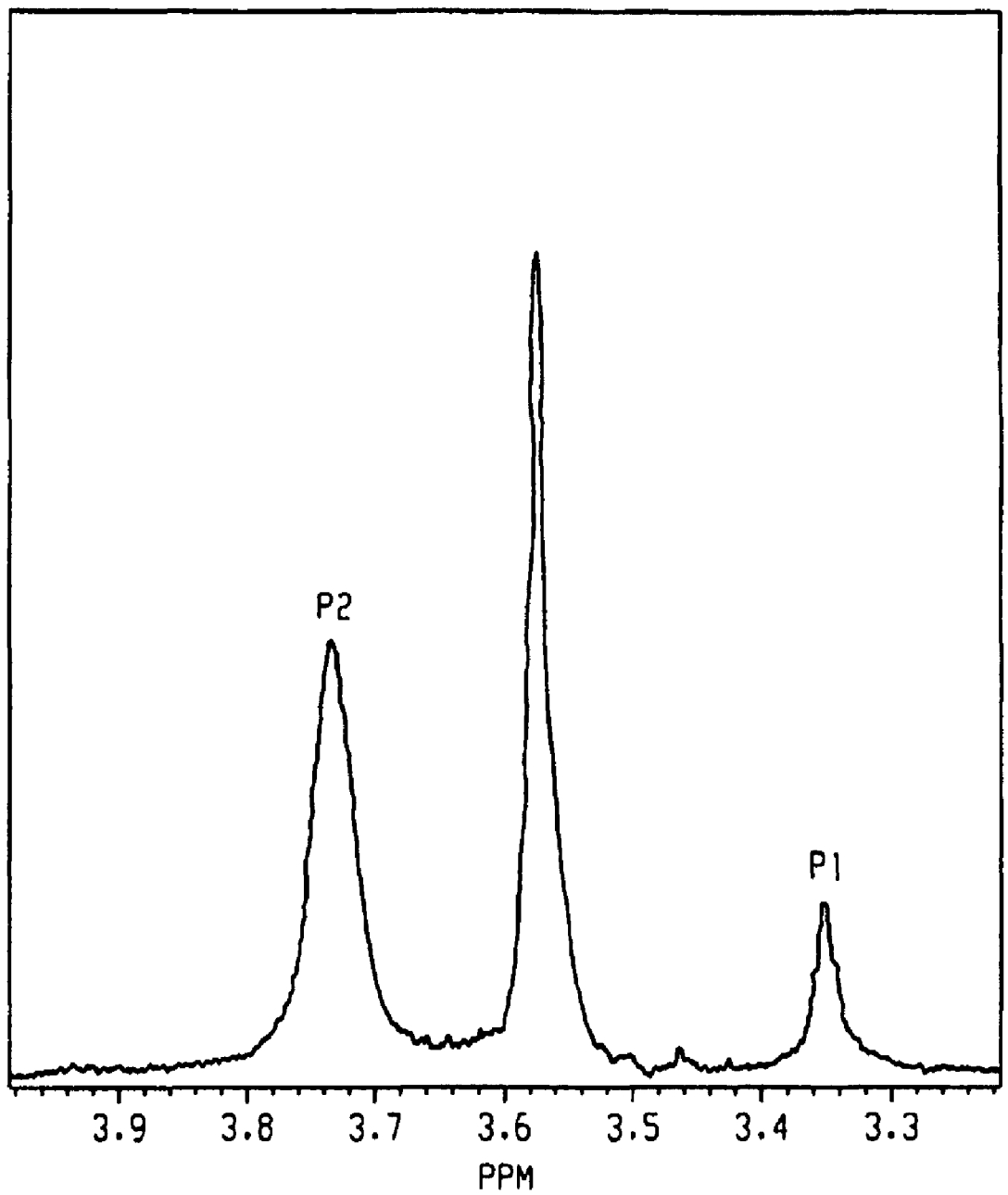
FIG. 3 is a representative $^1$H NMR spectrum of a poly(2,6-dimethyl-1,4-phenylene ether) from the working examples over the chemical shift range of 3.2 to 4.0 ppm.
Figure 4:
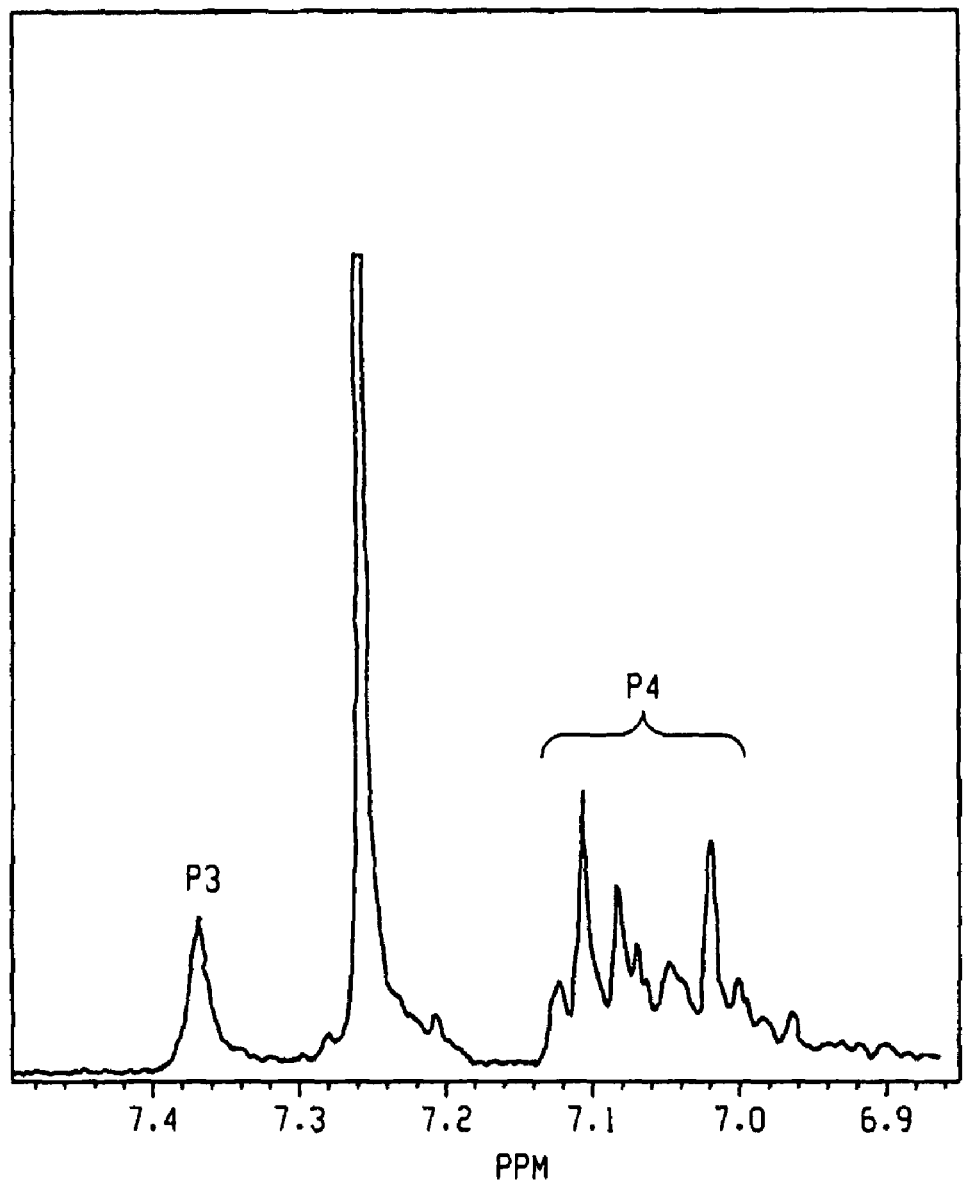
FIG. 4 is a representative $^1$H NMR spectrum of a poly(2,6-dimethyl-1,4-phenylene ether) from the working examples over the chemical shift range of 6.86 to 7.5 ppm.
Figure 5:
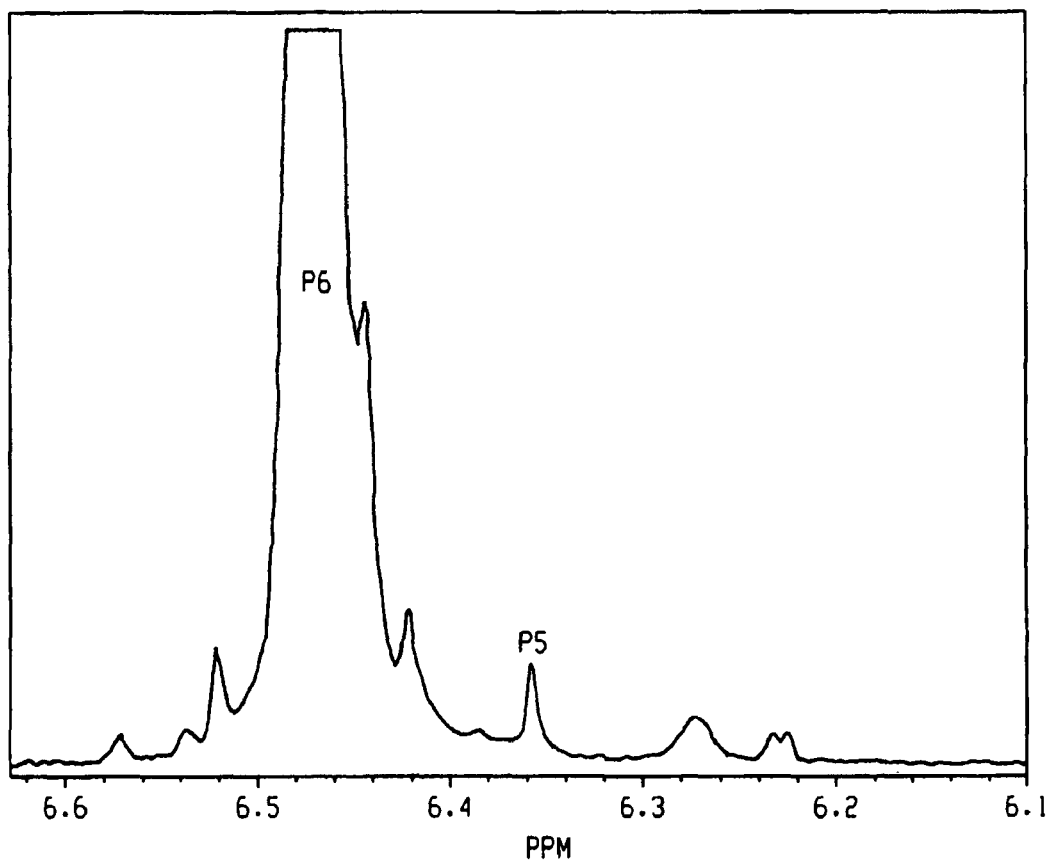
FIG. 5 is a representative $^1$H NMR spectrum of a poly(2,6-dimethyl-1,4-phenylene ether) from the working examples over the chemical shift range of 6.1 to 6.62 ppm.

The values of weight %, absolute molecular weight, and mol % obtained from $^1$H NMR were calculated as described in the equations below. Relevant portions of the $^1$H NMR spectra are given in FIGS. 3 to 5. The proton peaks which were integrated for the calculations are indicated by P1 to P5 in FIGS. 3-5. The peaks correspond to the protons indicated by P1 to P5 in the chemical structures below. Internal morpholine is based on the peak at 3.36 ppm (FIG. 3) for 2 protons (P1); terminal morpholine is based on the peak at 3.74 ppm (FIG. 3) for 4 protons (P2); internal biphenyl is based on the peak at 7.35 ppm (FIG. 4) for 4 protons (P3); PPE tail is based on the peak at 7.09 ppm (FIG. 4) for 3 protons (P4); PPE-OH head is based on the peak at 6.36 ppm (FIG. 5) for 2 protons (P5); and PPE repeat unit is based on the peak at 6.46 ppm (FIG. 5) for 2 protons (P6). Molecular weight values used in the calculations were 86 for internal and terminal morpholine ($C_4H_8NO$), 240 for 2,2',6,6'-tetramethyl-4,4'-biphenoxy ($C_{16}H_{16}O_2$), and 120 for PPE tail ($C_8H_9O$).

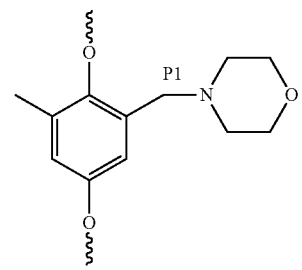

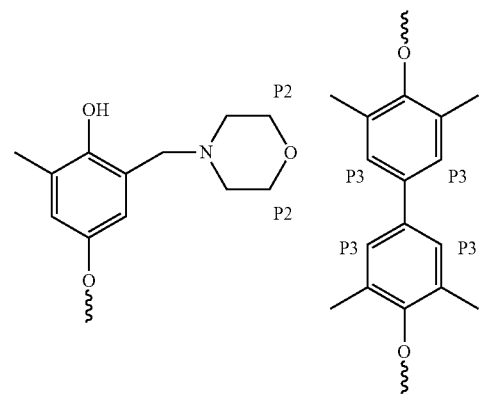

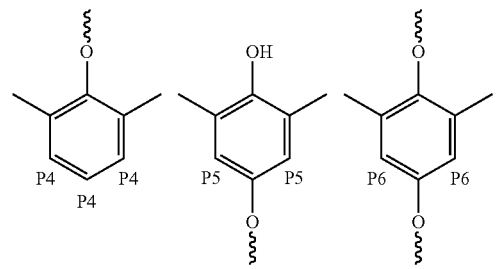

A general equation for calculating the weight percent of a functional group is given below as equation (1).

$$\frac{\text{Moiety Peak Integral}}{\text{PPE Repeat Unit Integral}} \times \frac{Mw \text{ Moiety (see text)}}{Mw \text{ PPE Repeat Unit (120)}} \times \frac{\begin{array}{c}\text{Number Equivalent}\\ \text{Protons } PPE(2)\end{array}}{\begin{array}{c}\text{Number Equivalent}\\ \text{Protons Moiety}\\ \text{(see text)}\end{array}} \times 100 = \begin{array}{c}\text{Wt. \%}\\ \text{Moiety}\\ \text{(to } PPE)\end{array} \quad (1)$$

An equation for calculating polymer molecular weight based on NMR integrals for, internal and terminal groups is given below as equation (2).

$$\frac{\left(\left(\frac{Int\ Biph\ Integral}{4}*2\right)+\left(\frac{Int\ Morph\ Integral}{2}\right)+\left(\frac{PPE\ rep\ unit\ Integral}{2}\right)\right)}{\left(\begin{array}{c}((PPE-OH\ Integral)/2)+\\ (Ext\ Morph\ Integral/4)-\\ (PPE\ Tail\ Integral/3)\end{array}\right)*0.5+(PPE\ Tail\ Integral/3)} \times 120 = \text{Absolute Molecular Weight} \quad (2)$$

An equation for calculating the mole percent of a functional group is given below as equation (3).

$$\frac{\text{Moiety Peak Integral}}{\text{PPE Repeat Unit Integral}} \times \frac{\text{Number Equivalent Protons } PPE(2)}{\text{Number Equivalent Protons Moiety}} \times \frac{\text{Absolute Molecular Weight}}{120} \times 100 = \text{Mol. \% Moiety (to } PPE) \quad (3)$$

(see text)

TABLE 3

|        | IV    | $M_n$ | $M_w$  | $D (M_w/M_n)$ | $M_p$ | % < 500K | Mw/Mp | Mp/Mn | Mono |
|--------|-------|-------|--------|---------------|-------|----------|-------|-------|------|
| C. Ex. 1 | 0.722 | 29624 | 131530 | 4.44 | 63505 | 96.15 | 2.07 | 2.14 | yes |
| Ex. 1    | 0.618 | 28790 | 90790  | 3.15 | 61632 | 99.26 | 1.47 | 2.14 | yes |
| C. Ex. 2 | 0.593 | 22639 | 115990 | 5.12 | 55824 | 96.76 | 2.08 | 2.47 | yes |
| C. Ex. 3 | 0.177 | 5829  | 26292  | 4.51 | 9556  | 99.84 | 2.75 | 1.64 | yes |
| Ex. 2    | 0.412 | 23970 | 55573  | 2.32 | 41178 | 99.89 | 1.35 | 1.72 | yes |
| Ex. 3    | 0.416 | 24897 | 63477  | 2.55 | 39905 | 99.46 | 1.59 | 1.60 | yes |
| C. Ex. 4 | 0.361 | 16870 | 55369  | 3.28 | 33686 | 98.58 | 1.64 | 2.00 | no  |

For characterization of the composition as a function of molecular weight fraction, fractions from six gel permeation chromatography injections (36 mg of total material injected) were collected using a Gilson fraction collector. The effluent eluting between 9 and 23 minutes run time was divided over 60 test tubes which were later recombined to give 6 fractions with each containing approximately 16.67% of the total poly (2,6-dimethyl-1,4-phenylene ether), as determined from area percent of the chromatogram. After evaporation of the fractions to approximately 15 milliliters under nitrogen flow, a small part (200 microliters) of the six fractions was analyzed by gel permeation chromatography to confirm the success of the fractionation. The remaining part was used for $^1$H NMR analysis. The portion used for NMR analysis was evaporated to dryness at 50° C. under a nitrogen flow. One milliliter of deuterated chloroform (with tetramethylsilane as internal standard) was added and the samples were analyzed by $^1$H NMR (512 scans). The results are presented in Table 4.

TABLE 4

| | $M_n$ | $M_w$ | $M_p$ | Mono | Frac $M_n$/Bulk $M_n$ | Frac $M_w$/Bulk $M_w$ | wt % MW ≥ 15 × $M_n$ | wt % MW ≥ 5 × $M_p$ | wt % MW ≥ 7 × $M_p$ | wt % Term. Morph | Mol % Int. Morph | Mol % Term. Morph | Mol % Int. Biph | Term./Int. Morph | Term 6/Term 1 |
|---|---|---|---|---|---|---|---|---|---|---|---|---|---|---|---|
| C. Ex. 1 | | | | | | | | | | | | | | | |
| Whole sample | 30500 | 105500 | 54900 | Yes | 1.00 | 1.00 | 4.2 | 7.4 | 4.2 | 0.33 | 37.4 | 60.6 | 18.4 | 1.62 | 1.23 |
| Fraction 1 | 122700 | 464200 | 302800 | | 4.02 | 4.40 | | | | 0.14 | 93.7 | 38.0 | 27.6 | 0.41 | |
| Fraction 2 | 101000 | 180600 | 153400 | | 3.31 | 1.71 | | | | 0.17 | 70.1 | 52.0 | 30.4 | 0.74 | |
| Fraction 3 | 62900 | 103000 | 92000 | | 2.06 | 0.98 | | | | 0.21 | 54.1 | 55.7 | 20.5 | 1.03 | |
| Fraction 4 | 39500 | 60200 | 53900 | | 1.30 | 0.57 | | | | 0.29 | 46.6 | 68.9 | 16.4 | 1.48 | |
| Fraction 5 | 24300 | 36400 | 30200 | | 0.80 | 0.35 | | | | 0.41 | 30.6 | 72.1 | 14.2 | 2.35 | |
| Fraction 6 | 7185 | 21000 | 16700 | | 0.24 | 0.20 | | | | 0.78 | 17.6 | 46.5 | 12.9 | 2.65 | |
| Ex. 1 | | | | | | | | | | | | | | | |
| Whole sample | 29900 | 76600 | 54400 | Yes | 1.00 | 1.00 | 1.2 | 2.9 | 1.1 | 0.28 | 30.9 | 55.9 | 6.6 | 1.81 | 1.99 |
| Fraction 1 | 122300 | 255700 | 196100 | | 4.09 | 3.34 | | | | 0.08 | 63.9 | 24.8 | 13.0 | 0.39 | |

TABLE 4-continued

|  | $M_n$ | $M_w$ | $M_p$ | Mono | Frac $M_n$/ Bulk $M_n$ | Frac $M_w$/ Bulk $M_w$ | wt % MW ≧ 15 × $M_n$ | wt % MW ≧ 5 × $M_p$ | wt % MW ≧ 7 × $M_p$ | wt % Term. Morph | Mol % Int. Morph | Mol % Term. Morph | Mol % Int. Biph | Term./ Int. Morph | Term 6/ Term 1 |
|---|---|---|---|---|---|---|---|---|---|---|---|---|---|---|---|
| Fraction 2 | 82200 | 122500 | 111400 |  | 2.75 | 1.60 |  |  |  | 0.12 | 62.3 | 39.0 | 6.2 | 0.63 |  |
| Fraction 3 | 56500 | 82700 | 78200 |  | 1.89 | 1.08 |  |  |  | 0.18 | 54.6 | 56.5 | 11.7 | 1.03 |  |
| Fraction 4 | 40200 | 58800 | 40200 |  | 1.34 | 0.77 |  |  |  | 0.26 | 38.7 | 65.8 | 6.7 | 1.70 |  |
| Fraction 5 | 28000 | 41200 | 35400 |  | 0.94 | 0.54 |  |  |  | 0.35 | 31.3 | 69.1 | 14.8 | 2.21 |  |
| Fraction 6 | 10200 | 23800 | 21100 |  | 0.34 | 0.31 |  |  |  | 0.58 | 17.2 | 49.4 | 6.4 | 2.86 |  |
| C. Ex. 2 |  |  |  |  |  |  |  |  |  |  |  |  |  |  |  |
| Whole sample | 25500 | 86500 | 49200 | Yes | 1.00 | 1.00 | 4.0 | 6.6 | 3.6 | 0.36 | 27.3 | 59.5 | 15.6 | 2.18 | 2.04 |
| Fraction 1 | 115200 | 391000 | 247200 |  | 4.52 | 4.52 |  |  |  | 0.11 | 64.4 | 23.8 | 27.9 | 0.37 |  |
| Fraction 2 | 90000 | 150800 | 128500 |  | 3.53 | 1.74 |  |  |  | 0.14 | 54.5 | 38.3 | 19.7 | 0.70 |  |
| Fraction 3 | 55300 | 87600 | 76000 |  | 2.17 | 1.01 |  |  |  | 0.22 | 49.8 | 55.4 | 19.8 | 1.11 |  |
| Fraction 4 | 35400 | 55900 | 49300 |  | 1.39 | 0.65 |  |  |  | 0.31 | 36.0 | 67.8 | 16.3 | 1.88 |  |
| Fraction 5 | 22900 | 35900 | 30900 |  | 0.90 | 0.42 |  |  |  | 0.42 | 26.0 | 68.6 | 13.5 | 2.64 |  |
| Fraction 6 | 5060 | 17700 | 17500 |  | 0.20 | 0.20 |  |  |  | 0.88 | 10.4 | 48.7 | 10.9 | 4.67 |  |
| C. Ex. 3 |  |  |  |  |  |  |  |  |  |  |  |  |  |  |  |
| Whole sample | 8260 | 22000 | 12400 | Yes | 1.00 | 1.00 | 3.2 | 7.2 | 4.5 | 0.14 | 1.5 | 9.1 | 17.9 | 5.98 | 0.36 |
| Fraction 1 | 53200 | 99800 | 64600 |  | 6.44 | 4.54 |  |  |  | 0.12 | 31.0 | 23.2 | 22.8 | 0.75 |  |
| Fraction 2 | 25200 | 33000 | 30100 |  | 3.05 | 1.50 |  |  |  | 0.09 | 9.5 | 16.5 | 30.4 | 1.73 |  |
| Fraction 3 | 15400 | 19800 | 18200 |  | 1.86 | 0.90 |  |  |  | 0.06 | 2.1 | 7.8 | 29.3 | 3.75 |  |
| Fraction 4 | 9920 | 13200 | 11900 |  | 1.20 | 0.60 |  |  |  | 0.07 | 1.5 | 5.7 | 22.7 | 3.66 |  |
| Fraction 5 | 6315 | 9215 | 8685 |  | 0.76 | 0.42 |  |  |  | 0.12 | 1.1 | 6.8 | 18.0 | 5.95 |  |
| Fraction 6 | 2395 | 5500 | 4635 |  | 0.29 | 0.25 |  |  |  | 0.31 | 1.0 | 8.3 | 8.7 | 8.59 |  |
| Ex. 2 |  |  |  |  |  |  |  |  |  |  |  |  |  |  |  |
| Whole sample | 25600 | 48700 | 38500 | Yes | 1.00 | 1.00 | 0.3 | 2.2 | 0.8 | 0.26 | 10.7 | 50.0 | 0.3 | 4.66 | 1.38 |
| Fraction 1 | 95500 | 153300 | 118000 |  | 3.73 | 3.15 |  |  |  | 0.08 | 54.2 | 26.4 | 6.2 | 0.49 |  |
| Fraction 2 | 59600 | 77800 | 71700 |  | 2.33 | 1.60 |  |  |  | 0.14 | 37.4 | 46.9 | 9.6 | 1.25 |  |
| Fraction 3 | 39600 | 53900 | 51200 |  | 1.55 | 1.11 |  |  |  | 0.14 | 29.8 | 38.1 | 5.0 | 1.28 |  |
| Fraction 4 | 29300 | 39100 | 40000 |  | 1.14 | 0.80 |  |  |  | 0.18 | 17.6 | 37.3 | 4.4 | 2.11 |  |
| Fraction 5 | 21600 | 28500 | 27300 |  | 0.84 | 0.59 |  |  |  | 0.22 | 11.8 | 36.4 | 3.0 | 3.09 |  |
| Fraction 6 | 7650 | 18500 | 18100 |  | 0.30 | 0.38 |  |  |  | 0.49 | 9.7 | 36.4 | 3.6 | 3.75 |  |
| Ex. 3 |  |  |  |  |  |  |  |  |  |  |  |  |  |  |  |
| Whole sample | 25400 | 49700 | 38600 | Yes | 1.00 | 1.00 | 0.7 | 2.6 | 1.3 | 0.25 | 17.7 | 50.4 | 0.1 | 2.85 | 1.12 |
| Fraction 1 | 81000 | 159600 | 94400 |  | 3.19 | 3.21 |  |  |  | 0.09 | 57.7 | 29.9 | 13.3 | 0.52 |  |
| Fraction 2 | 44200 | 63900 | 54300 |  | 1.74 | 1.29 |  |  |  | 0.12 | 39.1 | 37.6 | 11.3 | 0.96 |  |
| Fraction 3 | 32000 | 47400 | 40500 |  | 1.26 | 0.95 |  |  |  | 0.16 | 25.3 | 37.3 | 7.1 | 1.48 |  |
| Fraction 4 | 28100 | 42900 | 47600 |  | 1.11 | 0.86 |  |  |  | 0.18 | 22.3 | 39.4 | 7.1 | 1.76 |  |
| Fraction 5 | 23900 | 34600 | 34700 |  | 0.94 | 0.70 |  |  |  | 0.20 | 18.8 | 39.1 | 6.0 | 2.08 |  |
| Fraction 6 | 8600 | 21100 | 20100 |  | 0.34 | 0.42 |  |  |  | 0.41 | 12.7 | 33.6 | 6.8 | 2.65 |  |
| C. Ex. 4 |  |  |  |  |  |  |  |  |  |  |  |  |  |  |  |
| Whole sample | 19200 | 52000 | 38000 | No | 1.00 | 1.00 | 2.4 | 3.4 | 2.6 | 0.20 | 6.5 | 28.4 | 3.8 | 4.39 | 4.37 |
| Fraction 1 | 79800 | 251200 | 99900 |  | 4.16 | 4.83 |  |  |  | 0.03 | 35.6 | 5.8 | 47.1 | 0.16 |  |
| Fraction 2 | 52600 | 69700 | 67300 |  | 2.74 | 1.34 |  |  |  | 0.09 | 19.9 | 29.6 | 5.5 | 1.49 |  |
| Fraction 3 | 37400 | 50000 | 49600 |  | 1.95 | 0.96 |  |  |  | 0.13 | 10.6 | 31.2 | 4.4 | 2.93 |  |
| Fraction 4 | 25900 | 35300 | 34500 |  | 1.35 | 0.68 |  |  |  | 0.19 | 7.3 | 34.1 | 4.7 | 4.67 |  |
| Fraction 5 | 17200 | 24900 | 22200 |  | 0.90 | 0.48 |  |  |  | 0.22 | 3.2 | 27.4 | 2.7 | 8.48 |  |
| Fraction 6 | 5210 | 13900 | 12500 |  | 0.27 | 0.27 |  |  |  | 0.51 | 2.0 | 25.4 | 2.3 | 12.84 |  |

Based on the properties in Tables 3 and 4, a least four features distinguish the inventive and comparative examples. First, as indicated in Table 4, each of the comparative examples comprises greater than 2.2 weight percent of poly (2,6-dimethyl-1,4-phenylene ether) having a molecular weight more than 15 times the number average molecular weight of the sample as a whole. The practical significance of this first difference is that the inventive poly(2,6-dimethyl-1, 4-phenylene ether) resins will exhibit reduced melt breakage in extrusion applications. Second, as indicated in Table 3, Comparative Example 4 does not have a monomodal molecular weight distribution between 250 and 1,000,000 atomic mass units. The existence of a high molecular weight shoulder in the Comparative Example 4 sample also contributes to diminished performance in extrusion applications. Third, as indicated in Table 4, Comparative Example 4 comprises a first (highest molecular weight) fraction wherein less than 10 mole percent of poly(2,6-dimethyl-1,4-phenylene ether) comprises a terminal morpholine-substituted phenoxy group. The practical significance of this third difference is that the poly(2,6-dimethyl-1,4-phenylene ether)s of the inventive process will exhibit greater molecular weight increases during compounding with other components, and they will be more easily compatibilized with polyamides. Fourth, as indicated in the Table 4 column labeled "Term6/Term1", Comparative Example 4 comprises a much higher mole percent of morpholine-terminated poly(2,6-dimethyl-1,4-phenylene ether) in its lowest molecular weight fraction (fraction 6) than in its highest molecular weight fraction (fraction 1). The practical significance of this fourth difference is better molecular weight build during compounding, and better compatibilization with polyamides.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A poly(2,6-dimethyl-1,4-phenylene ether),
wherein a purified sample of poly(2,6-dimethyl-1,4-phenylene ether) prepared by dissolution of the poly(2,6-dimethyl-1,4-phenylene ether) in toluene, precipitation from methanol, reslurry, and isolation
has a monomodal molecular weight distribution in the molecular weight range of 250 to 1,000,000 atomic mass units, and
comprises less than or equal to 2.2 weight percent of poly(2,6-dimethyl-1,4-phenylene ether) having a molecular weight more than fifteen times the number average molecular weight of the entire purified sample;
wherein the purified sample after separation into six equal poly(2,6-dimethyl-1,4-phenylene ether) weight fractions of decreasing molecular weight comprises a first, highest molecular weight fraction; and
wherein the first, highest molecular weight fraction comprises at least 10 mole percent of poly(2,6-dimethyl-1,4-phenylene ether) comprising a terminal morpholine-substituted phenoxy group.

2. The poly(2,6-dimethyl-1,4-phenylene ether) of claim 1, wherein the purified sample comprises less or equal to 2.4 weight percent of poly(2,6-dimethyl-1,4-phenylene ether) having a molecular weight greater than seven times the peak molecular weight of the entire purified sample.

3. The poly(2,6-dimethyl-1,4-phenylene ether) of claim 1, wherein the purified sample comprises less than or equal to 3.2 weight percent of poly(2,6-dimethyl-1,4-phenylene ether) having a molecular weight greater than five times the peak molecular weight of the entire purified sample.

4. The poly(2,6-dimethyl-1,4-phenylene ether) of claim 1, wherein the first, highest molecular weight fraction comprises 10 to 40 mole percent of poly(2,6-dimethyl-1,4-phenylene ether) comprising a terminal morpholine-substituted phenoxy group.

5. The poly(2,6-dimethyl-1,4-phenylene ether) of claim 1, wherein the purified sample comprises 0.1 to 2.2 weight percent of poly(2,6-dimethyl-1,4-phenylene ether) having a molecular weight more than fifteen times greater than the number average molecular weight of the entire purified sample.

6. The poly(2,6-dimethyl-1,4-phenylene ether) of claim 1,
wherein the first, highest molecular weight fraction comprises 10 to 40 mole percent of poly(2,6-dimethyl-1,4-phenylene ether) comprising a terminal morpholine-substituted phenoxy group; and
wherein the purified sample comprises 0.1 to 2.2 weight percent of poly(2,6-dimethyl-1,4-phenylene ether) having a molecular weight more than fifteen times greater than the number average molecular weight of the entire purified sample.

7. The poly(2,6-dimethyl-1,4-phenylene ether) of claim 1,
wherein the purified sample after separation into six equal poly(2,6-dimethyl-1,4-phenylene ether) weight fractions of decreasing molecular weight comprises
a first, highest molecular weight fraction characterized by a first fraction mole percent of poly(2,6-dimethyl-1,4-phenylene ether) comprising a terminal morpholine-substituted phenoxy group, and
a sixth, lowest molecular weight fraction characterized by a sixth fraction mole percent of poly(2,6-dimethyl-1,4-phenylene ether) comprising a terminal morpholine-substituted phenoxy group, and
wherein a ratio of the sixth fraction mole percent of poly(2,6-dimethyl-1,4-phenylene ether) comprising a terminal morpholine-substituted phenoxy group to the first fraction mole percent of poly(2,6-dimethyl-1,4-phenylene ether) comprising a terminal morpholine-substituted phenoxy group is less than or equal to 4.

* * * * *